United States Patent [19]

Crow

[11] Patent Number: 4,964,665
[45] Date of Patent: Oct. 23, 1990

[54] PECAN NUT COLLECTOR

[76] Inventor: John Q. Crow, 1609 W. 8th St., Texarkana, Tex. 75501

[21] Appl. No.: 372,018

[22] Filed: Jun. 27, 1989

[51] Int. Cl.$^5$ ............................................. A01D 46/00
[52] U.S. Cl. ..................................... 294/19.2; 56/332
[58] Field of Search ..................... 294/19.2, 19.1, 50.7; 56/327.1, 328.1, 332

[56] References Cited

U.S. PATENT DOCUMENTS

| | | | |
|---|---|---|---|
| 2,210,440 | 8/1940 | Avary | 294/50.7 |
| 2,516,622 | 7/1950 | George | 294/19.2 X |
| 2,810,252 | 10/1957 | Kelly | 294/19.2 X |
| 4,058,336 | 11/1977 | Parkinson | 294/19.2 |
| 4,629,235 | 12/1986 | Logue | 294/19.2 |

FOREIGN PATENT DOCUMENTS 3132761  3/1983  Fed. Rep. of Germany ..... 294/19.2

*Primary Examiner*—Margaret A. Focarino
*Assistant Examiner*—Dean J. Kramer
*Attorney, Agent, or Firm*—Stephen D. Carver

[57] ABSTRACT

A portable hand-held collector for retrieving irregularly shaped nuts or objects from the ground while the user maintains a substantially erect posture. The body of the collector comprises a pair of tubes of substantially equivalent inner and outer diameter axially coupled by a rigid sleeve. The input tube is axially coupled to a tubular insert comprising an input orifice normally blocked by a plurality of flexible, spaced apart springs. When the collector is pressed down on target nuts, the springs resiliently yield to admit the nuts interiorly of the insert. After the nuts are captured within the input tube, the springs assume their original orientation preventing captured nuts from escaping. The inner diameter of the tabular insert is smaller than the inner diameter of the input tube, so an annular shoulder is formed. Incoming nuts pass the annular shoulder on their way into the input tube. Downward pressures generated by accumulated nuts above the insert are partly dissipated by the shoulder, so as not to overpressure the springs. A separable storage tube retains collected nuts and is closed by a pivotal gate which prevents the return of captured nuts to the input tube. The storage tube is normally closed by a cap anchored to the collector body by a cord which prevents its disassociation and loss. The collector may be conveniently dissembled for storage and transport after use.

3 Claims, 2 Drawing Sheets

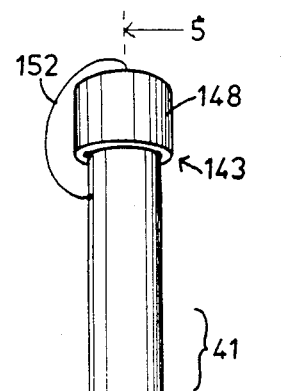
FIG.1
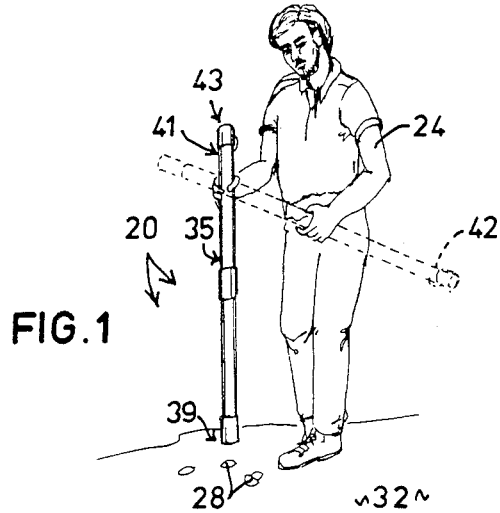
FIG.2
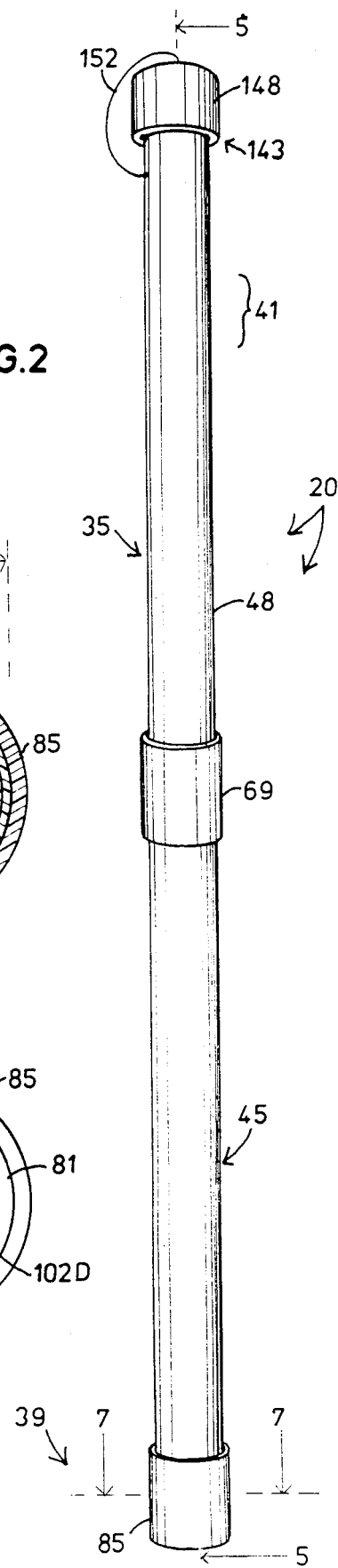
FIG.5
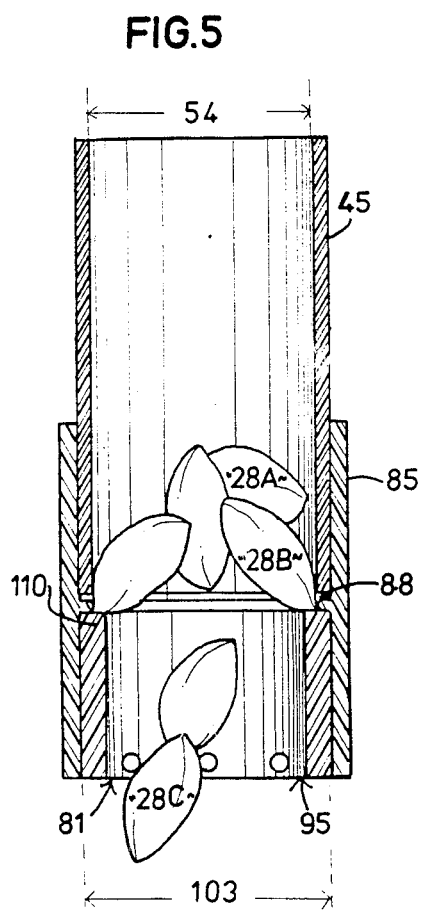
FIG.7
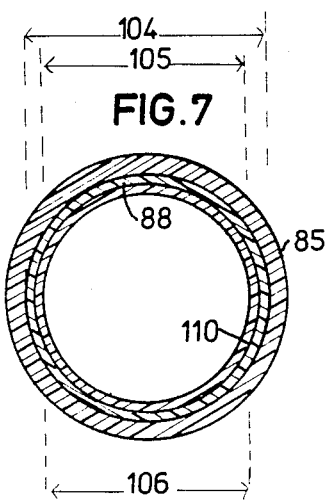
FIG.8
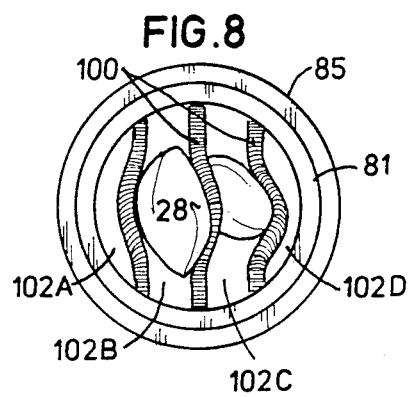

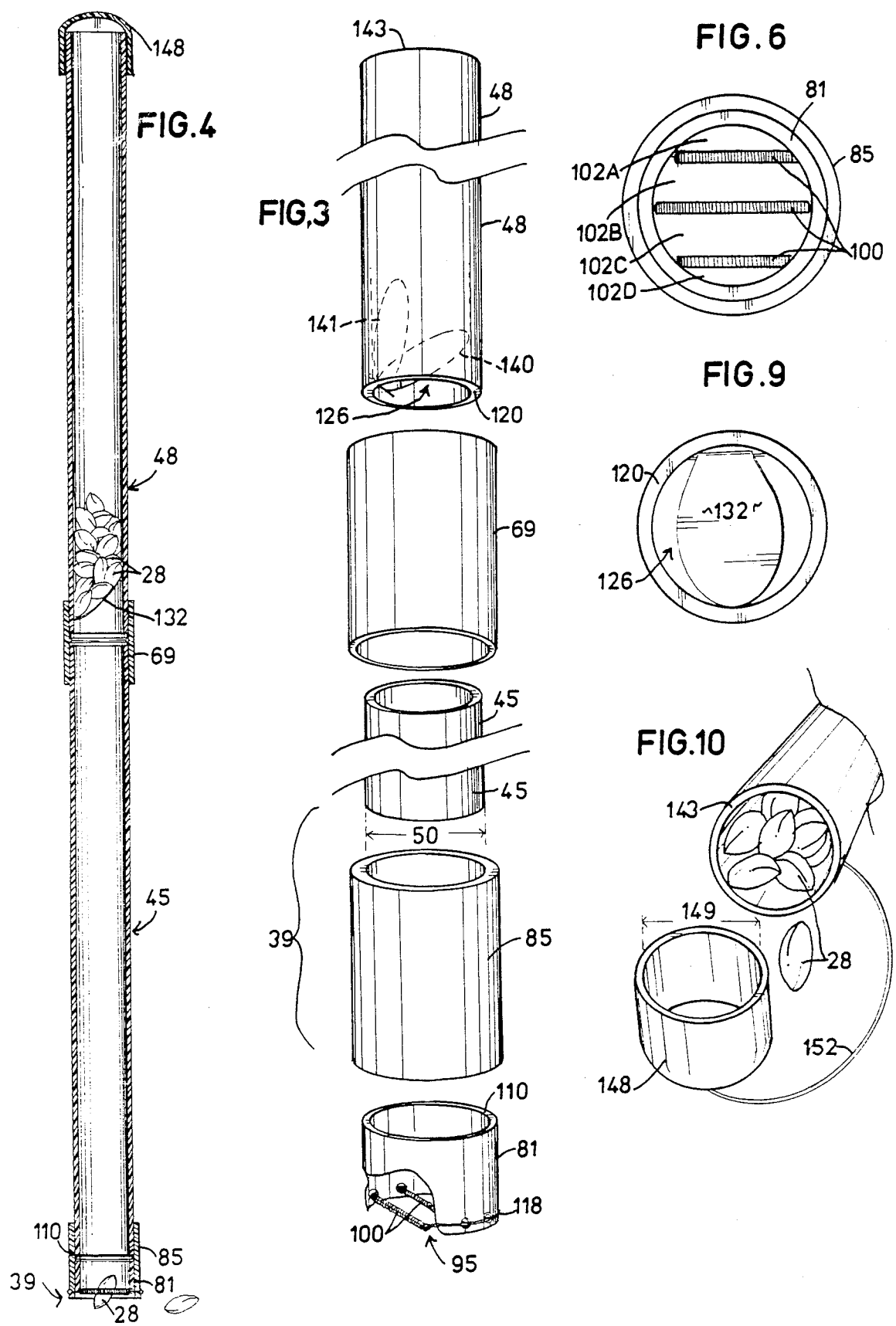

PECAN NUT COLLECTOR

BACKGROUND OF THE INVENTION

The present invention relates broadly to apparatus for retrieving objects from the ground. More specifically, the present invention relates to hand-held nut harvesting devices. This invention is believed best classified in U.S. Class 294, subclass 19.1.

Pecans and other tree-borne nuts are typically harvested after they have fallen to the ground. As will be appreciated, manually retrieving nuts scattered about upon the ground is extremely time-consuming. For example, a harvester manually retrieving nuts would have to work many hours to gather the harvest from a single pecan tree. The use of shovels and similar devices adapted to sweep nuts from a large are of the ground has proven unsuccessful, since such devices simultaneously gather all manner of other undesirable products, such as grass, leaves, and trash, which must be subsequently removed. For the owner of a relatively small pecan orchard, for example, such labor-intensive harvesting methods are completely unprofitable. Hence, it is desirable to provide a nut harvester device which can be used to quickly retrieve a number of nuts from an area without gathering trash and other undesired objects.

Moreover, manual harvesting techniques are physically quite demanding. The harvester's hands quickly weary from repeated reaching, grasping, and contacting the rough nut shells. Continual bending over a long period of time may unduly strain the picker's back and leg muscles, and overtax the respiratory and circulatory systems. Hence it is desirable to provide a device which permits a harvester to retrieve a plurality of nuts from a large area without handling each nut and while maintaining a generally erect posture.

Over the years, various inventions have been proposed for simplifying the task. One broad category of harvesting devices known in the prior art is represented by U.S. Pat. No. 2,749,697, issued to Poche on June 12, 1956; U.S. Pat. No. 3,604,190, issued to Wray on September 14, 1971; and U.S. Pat. No. 4,332,939, issued April 6, 1982 to McDonald. The pecan pickers described therein generally comprise an elongated handle mounted upon a nut gathering head or roller comprised of a plurality of resilient members defining a hollow cage-like center. When the head contacts a nut on the ground, the nut forces the members to flex apart to admit the nut, which then remains trapped within the interior cage. Undesired trash falls easily between the resilient members when the device is shaken. When the cage is full, the harvester may then quickly dump the load of nuts from the head into a basket or similar receptacle. A similar roller-type device proposed by Livingston, U.S. Pat. No. 4,066,179, issued January 3, 1978, includes a separate collection container mounted upon the roller frame.

Another broad category of gathering devices proposed in the prior art known to me generally comprises baskets or similar enclosures mounted to the end of an elongated rod or handle. For example, U.S. Pat. No. 3,982,781, issued September 28, 1976 to Tucker et al., illustrates the use of a bag-like enclosure which has an open receiving end. The receiving end is covered with springs which resiliently respond when the device is pressed against a golf ball to be retrieved. The balls are then stored within the bag and manually removed through a zipper opening in the side of the bag. A similar device disclosed by McVey, U.S. Pat. No. 4,715,632, issued December 29, 1987, employs a rigid hollow shell having an open bottom surrounded by a plurality of downwardly and inwardly extending fingers. When shell is pressed down upon the object to be retrieved, the fingers retract inwardly to admit the object into the hollow interior of the shell. When the device is raised, the captured object is trapped by the fingers, until it is dumped by the user from an outlet defined in a side wall thereof.

Of additional relevance to the present minvention are various golf ball retrieval devices such as those defined by MacDonald in U.S. Pat. No. 1,937,828, issued December 5, 1953 and U.S. Pat. No. 2,027,546, issued January 4, 1936; by Watson, U.S. Pat. No. 2,760,807, issued August 28, 1956; by Fowler, U.S. Pat. No. 2,962,321, issued November 29, 1960; and by Shott, U.S. Pat. No. 3,901,545, issued August 26, 1975. The latter-mentioned references illustrate the concept of providing an elongated tube dimensioned for receiving and storing golf balls. Various devices for retaining the golf balls within the tube after entry are also proposed. For example, Fowler, '321 employs a spring-biased mechanical latch which rotates upwardly to admit a ball and rotates downwardly to block the tube. Flexible tab members are positioned about the mouth of the Watson '807 and Shott '545.

The most relevant prior art retrieval devices known to me are found in U.S. Pat. No. 3,258,286, issued June 28, 1966 to Coward and in U.S. Pat. No. 4,596,413, issued June 24, 1986 to La Porte. The golf ball retriever defined by Coward comprises a hollow casing having a hinged top cover and mounted upon an elongated hand-held rod. The ball-receptive input orifice defined at the lower end of the casing is covered by cooperative springs which flex to receive golf balls positioned upon the ground, and subsequently resiliently respond to retain the golf balls within the casing. The latter La Porte '413 reference discloses a device adapted to retrieve beverage cans and similar trash from the ground. Parallel springs extending across the lower mouth of the housing are spaced so as to receive larger cans and bottles while permitting smaller articles to fall away. A pivotal gate divides the internal cavity into the lower bottle-receptive chamber and an upper chamber for receiving litter or other trash manually retrieved by a separate hand pick device, which is removably mounted upon the housing wall. Emptying the chambers after use is facilitated by a pivotal handgrip.

However, based on my experience, none of the above-referenced retrieval devices is suitable for collecting a large harvest of pecans. One major disadvantage encountered with the flexible roller head retrievers is that they are inefficient and cannot be used for the collection of a large pecan harvest. In general, the flexible tines used in such devices quickly break or become badly deformed and cannot be replaced. Moreover, such devices are typically made of metals, which are heavy and cumbersome, and they cannot be broken down or disassembled for convenient storage and transport.

The referenced tubular golf ball-retrieval devices known to me are unsuitable for collecting smaller and, in particular, irregularly shaped objects such as nuts. Moreover, none of the known prior art tubular gathering devices provide adequate means for receiving and handling several balls at one time. Such golf ball tubes thus must be placed over each individual ball, and no means are suggested for preventing the binding of irregularly shaped objects within the tube or the accumulation of undesired objects.

Finally, neither the Coward nor the LaPorte reference described hereinabove is suitable for use in a nut harvest. No means are suggested in these latter references for providing containers of suitable dimensions for nut collection, nor are means found for preventing binding of the collected objects within the receptive channels. Both of the latter devices are cumbersome, expensive to produce, and not readily adapted for convenient transport and storage. Moreover, no adequate cover means are provided to prevent the inadvertent release of gathered objects from the storage cavities during use.

Hence it is desired to present an improved pecan collector device which applies the best teachings of the prior art but overcomes the aforementioned disadvantages associated with the prior art gathering devices, and which can be inexpensively produced of readily available materials.

SUMMARY OF THE INVENTION

The present invention comprises a portable pecan collector which may be easily manipulated for gathering nuts from the ground while the user comfortably maintains an erect posture. The collector comprises an elongated housing preferably formed of two tubes of lightweight, weather-resistant PVC tubing. The lower input tube is axially joined to the upper storage tube by an intermediate sleeve.

The lower input tube terminates at its bottom in an open mouth through which nuts are admitted. The mouth comprises a rigid tubular insert axially coupled to the input tube by a second sleeve. A plurality of springs traversing the input orifice yieldably deflect to pass nuts into the insert and through to the tube when the housing is pressed down upon the nuts. The springs define an admission path flexibly varying between one-half to one and one-fourth inches in width. The outer diameter of the tubular insert is substantially equal to the outside diameter of the input tube, and both are firmly received within the second sleeve for axial coupling. The insert inner diameter, however, is smaller than the inner diameter of the input tube, so that an annular shoulder results at their abutting ends. The shoulder prevents captured objects disposed above it from blocking the springs below. Pressures exerted by stored nuts above the shoulder are transmitted to the shoulder to minimize the downward pressure exerted by the captivated nuts.

The upper tube encloses a storage cavity in which the captured nuts or objects may be stored. After sufficient nuts are captivated within the input tube, pressure may build up, so that more nuts are unable to enter past the springs, notwithstanding the previously discussed annular shoulder. However, the user may periodically transfer stored nuts to the upper tube simply by turning the housing upside down. Nuts drop through a one-way gate for immediate transfer into the storage region. By thereafter returning the housing to its normal orientation, the user may continue nut gathering.

The gate associated with the storage cavity is preferably secured within the lower portion of storage tube. However, it could function if disposed within the input tube. It allows one-way passage of the nuts from the input tube into the storage cavity. The gate pivots back to open the passageway when the housing is elevated, and pivots forward to block the return of nuts into the input tube when the housing is lowered again. The gate is preferably longer than the inner diameter of the housing, so that it can only pivot in one direction.

The upper tube preferably terminates in an open outlet end which may be temporarily covered during use by a slidably fitted, removable cap. Preferably a flexible cord links the cap to the tube body to prevent the cap from falling off and being lost. After use, the two tubes may be separated for convenient transport and storage. To release the nuts from the housing, the user need only remove the cap from the storage tube and tilt the storage tube upward, so that the nuts quickly pour out.

Hence it is a broad object of the present invention to provide a tool for facilitating the gathering of nuts and similar irregularly-shaped objects from the ground.

Another broad object of the present invention is to provide a harvester which permits the user to gather nuts or similar objects from the ground while maintaining a comfortable, generally erect posture.

A further broad object of the present invention is to provide a nut harvester which can be used to quickly retrieve a number of nuts from an area without gathering trash and other undesired objects.

Yet another broad object of the present invention is to provide a collector which overcomes the disadvantages associated with other manual harvesting devices, and which may be conveniently constructed of readily available, inexpensive, lightweight, weather-resistant materials such as PVC or similar plastic pipes.

Still another object of the present invention is to provide a harvester which includes means for effectively preventing collected objects from binding and blocking entry to the collector tube during use.

A further object of the present invention is to provide a harvester of the nature described which can be readily disassembled for convenient storage and transport.

Another object of the present invention is to provide a harvester of the nature described which employs flexible spring members which resiliently expand to define a passageway which conforms to the shape of the nut to be gathered.

Still another object of the present invention is to provide a harvester of the character described which includes means for preventing objects from falling back out onto the ground after they have been collected.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a pictorial view illustrating the best mode of my PECAN COLLECTOR in operation;

FIG. 2 is an enlarged scale, front perspective view thereof;

FIG. 3 is an enlarged scale, fragmentary, exploded view thereof, in which phantom lines are used to illustrate alternative positions of the preferred gate;

FIG. 4 is a cross-sectional view thereof, taken generally along line 5—5 of FIG. 2;

FIG. 5 is an enlarged scale, fragmentary sectional view of the preferred mouth thereof;

FIG. 6 is an enlarged scale, end plan view of the preferred mouth;

FIG. 7 is a sectional view taken generally along line 7—7 of FIG. 2;

FIG. 8 is an enlarged scale, fragmentary perspective view of the preferred mouth thereof, portions thereof being broken away for purposes of brevity and clarity;

FIG. 9 is a plan view of the end of the storage tube, taken generally from line 8—8 of FIG. 4; and, FIG. 10 is a fragmentary, perspective view of the end of the storage tube and the preferred cap assembly.

DETAILED DESCRIPTION

With initial reference directed to FIG. 1 of the appended drawings, the best mode of my collector device, generally designated by the reference numeral 20, is illustrated in operation by a user 24 for retrieving pecans or similar irregularly-shaped objects 28 from the ground 32. The hand-held collector 20 permits the user 24 to quickly and conveniently retrieve a plurality of such objects 28 while comfortably maintaining an erect posture.

The collector 20 broadly comprises an elongated tubular housing 35 terminating at one end in an open mouth 39. A storage region 41 is defined in the opposite end of the housing 35. User 24 may gather nuts 28 while walking by simply pressing the mouth 39 down over the target nuts 28. The nuts are captured within the mouth 39 as hereinafter described and fed upwardly into the interior of the housing 35. After collecting a plurality of nuts, the user 24 may turn the housing 35 upside down to an elevated position 42, so that the nuts roll down into the storage region 41. Thus the collected nuts are prevented from blocking the mouth 39 and escaping out of the housing 35. When the housing 35 is turned over again to its normal position 43, the nuts are mechanically restrained within the storage region away from the mouth 39, as described hereinafter.

With reference now directed to FIGS. 2–4, the best mode of the present invention contemplates a two-part housing 35 comprising an input tube 45 and a separable storage tube 48. Tubes 45 and 48 preferably comprise substantially equal lengths of lightweight, weather-resistant material such as PVC or similar plastic pipes having substantially equal outer and inner diameters. Such material is readily obtainable in most areas, is inexpensive, and lends itself well to the present configuration. The combined length of the tubes 45, 48 may be selected according to the user's height, so that the user 24 may work comfortably at the harvest without stooping or bending. For most users, collector 20 may be roughly four to four and one-half feet long. Based on my experimentation with pecans, the preferred outer diameter 50 (FIG. 3) of tubes 45, 48 is two and three-eighths inches (roughly 6 cm), and the inner diameter 54 (FIG. 5) of tubes 45, 48 is preferably two and three-sixteenths inches (roughly 5.4 cm).

The two tubes 45, 48 are linked together by a tubular sleeve 69, which comprises a standard PVC plastic pipe joint. As best viewed in FIG. 4, the interior ends of tubes 45, 48 are axially aligned ans slidably fitted into sleeve 69. Thus, the tubes 45, 48 may be separated for convenient storage. It will be appreciated that the inner diameter of the sleeve 69 is roughly equivalent to the outer diameter 50 of the tubes, so that a snug fit is achieved. The outer sleeve diameter is two and three-fourths inches (roughly 7 cm). A rigid shoulder 75 defined within sleeve 69 provides a smooth, gapless link between the adjacent ends of tubes 45, 48. Shoulder 75 has an inner diameter substantially equal to the inner diameter 54 of tubes 45, 48 (2 3/16 inches). The input tube 45 terminates at its outer end 79 in open mouth 39.

With reference now directed to FIGS. 4–7, mouth 39 comprises a tubular insert 81 axially linked to input tube 45 by a second tubular sleeve 85. An internal shoulder 88 defined within sleeve 85 abuts the ends of input tube 45 and insert 81. The lower end of the insert 81 defines an input orifice 95. Input orifice 95 is substantially blocked by a plurality of springs 100 resiliently mounted within opposing side walls of the tubular insert 81. Springs 100 are mounted in generally parallel, spaced-apart relation to define admission paths 102A–102D. As explained in the following paragraphs, the arrangement and dimensions of the last-mentioned components of the mouth 39 are critical to the proper operation of my collector 20.

Insert 81 preferably comprises a two and one-fourth to two and one-half inch (roughly 4.5 to 5 cm) length of PVC or similar composite tubing. Collar 85 comprises a conventional tubular PVC joint similar to sleeve 69. A rigid inwardly extending shoulder 88 is defined within sleeve 85. The outer diameter 50 of the input tube 45 and the outer diameter 103 of insert 81 (FIG. 5) are substantially equivalent (roughly 6 cm) and are also roughly equivalent to the inner diameter 104 of the sleeve 85 (FIG. 7), so that a snug fit between the components is achieved. The sleeve shoulder 88 also has an inner diameter 105 (FIG. 7) roughly equivalent to the inner diameter 54 of the input tube 45.

Importantly, as best viewed in FIGS. 5 and 7, the inner diameter 106 of insert 81 is smaller than inner diameter 54 of input tube 45. In the best mode, the ratio between inner diameter 54 of input tube 45 and inner diameter 106 of insert 81 is between 3:2 and 5:4. Thus, the diameter of input orifice 95 is preferably two inches (roughly 5.2 cm). The difference in diameter between input orifice 95 and input tube 45 results in an annular shoulder 110 within mouth 39 (FIGS. 5, 7). As described in detail in the operational section which follows, the annular shoulder 110 dissipates downward pressure exerted by nuts 28 collected within the input tube. The shoulder 110 thus prevents the collected nuts from blocking the mouth 39 and subsequently escaping through the springs 100. In the best mode, the springs 100 are arranged to accommodate pecans of normal dimensions.

With specific reference to FIG. 5, the best mode of my pecan collector 20 contemplates the use of three springs 100 mounted in generally parallel relationship, roughly one-half inch (roughly 1.3 cm) apart. Thus springs 100 define two intermediate admission paths 102B, 102C of approximately one-half inch (roughly 1.3 cm), and two smaller paths 102A, 102D. Based on my experimentation, the preferred width of unexpanded paths 102B, 102C is calculated to be smaller than pecans of typical dimension. Springs 100 will preferably expand to enlarge admission paths 102B, 102C to one and one-fourth inches (roughly 1.2 to 3.5 cm) wide. It will be appreciated that the springs 100 may be repositioned to conform the admission paths 102 to the dimensions of other desired irregularly-shaped objects, such as various fruits. Springs 100 are preferably anchored at their ends upon a wire or cord 118 mounted about the outer periphery of the tubular insert 81 (FIG. 3). By removing the insert 81 from the sleeve, wire 118 may be accessed, so that a damaged or distended spring 100 may be removed and replaced. The significance of the aforedescribed mouth arrangement is set forth in detail in the operational section which follows.

After nuts 28 are admitted through mouth 39, they may be stored within the collector housing 35. With reference now directed to FIGS. 3, 4, and particularly 9, the interior end 120 of storage tube 48 defines an access throat 126 which is normally substantially blocked by a gate 132. Gate 132 comprises a rigid plate preferably formed of readily available, weather-resistant metal material such as aluminum. Gate 132 is pivotally mounted for rotation about a rigid pin 138 anchored in opposite side walls of tube 48. Of course, gate 132 could be mounted anywhere above mouth 39 within housing 35. In the best mode, the length of gate 132 is greater than the inner diameter 54 of tube 48, measuring approximately two and three-quarter inches (roughly 7 cm). Thus gate 132 rests angularly with respect to throat 126 and is supported against the inner wall of tube 48. Gate 132 is permitted only one-way, upward rotation between a first position 140 (FIGS. 3, 4) and a second, raised position 141 (FIG. 3). As best viewed in FIG. 4, the gate 132 restrains nuts 28 from falling back into the input tube 45. The access end 143 of storage tube 48 is sealed by a slidably mounted cap 148.

With reference directed to FIGS. 3 and 10, cap 148 permits convenient retrieval of the captured nuts from the storage tube. The cap 148 comprises a standard PVC pipe cap, having an inner diameter 149 (FIG. 10) of approximately two and three-eighths inches (roughly 6 cm). The cap 148 is permanently linked to storage tube 48 by a flexible cord 152. One end of cord 152 penetrates the top of cap 148, and the opposite end terminates within the side wall of tube 48. The ends are secured by a knot or rigid fastener (not shown). Thus the cap is securely connected to the tube, so that the cap is not inadvertently lost. With the cap in place, the storage tube 48 may be separated from input tube 45 with the collected nuts 28 inside. Thus, the separated tubes may be conveniently transported or stored after use.

OPERATION

Collector 20 is held in the substantially vertical position 43 illustrated in FIG. 1 while the user maintains a comfortable erect position. As best viewed in FIGS. 4 and 8, target nuts 28 to be collected are covered by mouth 39. When the housing is pressed downward over a nut, springs 100 expand to conform to the outer contours of nut 28 and exert a captivating pressure thereupon. The nut is thus admitted through one of the admission paths 102B, 102C of the input orifice. If two or more nuts simultaneously enter adjacent paths 102B, 102C (FIG. 8), springs 100 will expand through smaller paths 102A, 102D.

The captured nut then passes into the interior of the tubular insert 81. The springs 100 resiliently return to their normal, parallel spaced-apart position, and thus prevent the collected nut from escaping through the mouth.

As best illustrated in FIG. 5, nut 28A passing through input orifice 95 will be pushed upwardly into insert 81 by subsequently entering nuts 28B, 28C. Nuts collecting within the insert exert downward pressure against the springs 100. If not restrained in some manner, the nuts would block the admission paths to prevent other nuts from being collected. If a large quantity of nuts applied sufficient downward pressure, the collected nuts could be forced back through the springs 100 and escape the housing. However, as the nuts are forced upwardly into insert 81, the nuts contact the annular shoulder 110, and are restrained by the shoulder from falling back against springs 100. The shoulder thus substantially dissipates the downward pressure exerted by the nuts collected within the input tube.

If a large quantity of nuts are collected in the input tube, other nuts would be prevented from subsequently entering the tube past the shoulder. To prevent such an interference with the operation of the collector, the user 24 simply turns the coollector 20 upside-down to an elevated position 42 such as that shown in dashed lines in FIG. 1. When the housing is elevated, gate 132 pivots backward to its open position 140. Thus throat 126 is cleared to permit the collected nuts to roll downwardly into the storage tube 48. It will be appreciated that the storage tube must be closed by the cap, so that the nuts do not fall out the access end onto the ground.

When the user returns the collector to its normal position 43, gate 132 pivots downwardly to its closed position 141. The nuts fall to rest against gate 132. Thus the nuts are mechanically restrained within the storage region and cannot interfere with passage of subsequently collected nuts. If desired, the user may separate the input tube from the storage tube, and retain the collected nuts within the storage region for convenient transport.

A particularly advantageous feature of the present structure is that it will not retain undesired trash such as leaves, paper, or small twigs, since such objects provide no surface engagable by spaced-apart springs 100. Additionally, solid objects substantially smaller than typically pecans, such as pebbles, toadstools, or gravel will not be retained, since they will quickly slip back out through paths 98B, 98C. Moreover, sufficient space is defined about gate 132 so that pebbles or similar solid objects smaller than pecans which may have inadvertently penetrated the housing will fall freely through throat 126 and out of the collector.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A hand-held nut collector constructed of lightweight, weather-resistant PVC tubing for permitting a harvester to gather nuts from the ground while maintaining a generally upright posture, said collector comprising:

an elongated tubular housing comprising an input tube, a storage tube, and a first sleeve for axially removably coupling said input and storage tubes together, said input and storage tubes having substantially equal inner diameters and substantially equal outer diameters;

a tubular insert at the bottom of said housing defining a mouth for capturing said nuts;

a second sleeve for axially coupling said tubular insert to said housing at the bottom of said input tube, said second sleeve comprising an interiorly defined sleeve shoulder, wherein said input tube and said tubular insert are maintained in spaced apart relation within said sleeve by said sleeve shoulder;

a plurality of parallel, spaced-apart springs resiliently extending across and normally blocking said mouth for flexibly bending upon contact with nuts to admit them into said collector, the springs defining nut-admission paths expandable from one-half to one and one-fourth inches wide;

said insert having an outer diameter substantially equal to the outer diameter of said input tube to facilitate mutual coupling by said second sleeve, but having an inner diameter smaller than the inner diameter of said input tube, whereby an annular shoulder is formed within said mouth to temporarily restrain nested nuts above said sleeve shoulder and to minimize downward pressure of captivated nuts upon said springs;

a gate for allowing one-way passage of objects from said input tube into said storage tube, said gate comprising a rigid plate pivotally anchored within said housing, wherein the length of said gate is greater than the inner diameter of said housing; and, a removable end cap for normally closing said storage tube for preventing inadvertent release of objects, said cap permanently linked by a flexible cord to said storage tube to prevent inadvertent separation.

2. The collector as defined in claim 1 wherein the ratio between the inner diameter of said input tube and the inner diameter of said tubular insert is between 3:2 and 5:4.

3. The collector as defined in claim 2 wherein the plurality of springs comprises three individual springs are removably anchored at their opposite ends by rigid pins mounted within receptive orifices defined in the side walls of said tubular insert, said springs resiliently cooperating to define admission paths flexibly varying between one-half and one and one-fourth inches (1.2 to 3.5 cm) wide.

* * * * *